(12) United States Patent
Reece et al.

(10) Patent No.: US 8,327,171 B2
(45) Date of Patent: Dec. 4, 2012

(54) METHOD AND APPARATUS FOR FACILITATING DEVICE HIBERNATION

(75) Inventors: Dean Reece, Foster City, CA (US); Simon M. Douglas, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/427,524

(22) Filed: Mar. 22, 2012

(65) Prior Publication Data

US 2012/0185715 A1 Jul. 19, 2012

Related U.S. Application Data

(60) Continuation of application No. 12/581,029, filed on Oct. 16, 2009, now Pat. No. 8,161,306, which is a division of application No. 11/411,363, filed on Apr. 25, 2006, now Pat. No. 7,640,440.

(51) Int. Cl.
*G06F 1/00* (2006.01)
*G06F 1/26* (2006.01)
*G06F 1/32* (2006.01)
*G06F 13/00* (2006.01)

(52) U.S. Cl. ............... 713/320; 713/300; 711/162

(58) Field of Classification Search ........... 713/300, 713/320; 711/162
See application file for complete search history.

(56) References Cited

U.S. PATENT DOCUMENTS

| | | | |
|---|---|---|---|
| 5,666,516 A | 9/1997 | Combs | |
| 5,666,540 A | 9/1997 | Hagiwara | |
| 5,751,860 A | 5/1998 | Su | |
| 6,336,153 B1 | 1/2002 | Izumida | |
| 6,438,668 B1 | 8/2002 | Esfahani | |
| 6,609,182 B1 | 8/2003 | Pedrizetti | |
| 6,611,919 B1 | 8/2003 | Matsuya | |
| 6,647,472 B2 * | 11/2003 | Atkinson et al. | 711/158 |
| 6,725,386 B1 | 4/2004 | Shah | |
| 6,883,037 B2 | 4/2005 | Kadatch | |
| 6,954,852 B2 | 10/2005 | Burokas | |
| 7,174,451 B2 | 2/2007 | Zimmer | |
| 7,210,045 B2 | 4/2007 | Dunstan | |
| 7,305,502 B2 | 12/2007 | Kadatch et al. | |
| 7,321,936 B2 | 1/2008 | Zimmerman | |
| 7,334,122 B2 | 2/2008 | Burokas | |
| 7,376,968 B2 | 5/2008 | Ritz | |
| 2003/0188147 A1 | 10/2003 | Hsu | |
| 2005/0289288 A1 | 12/2005 | Matheny et al. | |
| 2007/0124573 A1 | 5/2007 | Walker et al. | |

OTHER PUBLICATIONS

Notice of Allowance prepared by Examiner Abdelmoniem I. Elamin re related case (U.S. Appl. No. 11/411,363), mailed from USPTO on Dec. 2008.

* cited by examiner

*Primary Examiner* — Mark Connolly
(74) *Attorney, Agent, or Firm* — Park, Vaughan, Fleming & Dowler LLP; Anthony P. Jones

(57) ABSTRACT

One embodiment of the present invention provides a system that enables a computing device to save additional power by entering a "hibernation mode," wherein the active state of the computing device is preserved in non-volatile storage while power to volatile storage is turned off. During operation, the system reanimates a computing device from a hibernation image by restoring reanimation code from the hibernation image and then executing the reanimation code. While executing this reanimation code, the system restores the rest of the hibernation image by, reading compressed data containing the rest of the hibernation image, and decompressing the compressed data using computational circuitry within the computing device. During this process, the decompression operations are overlapped with the reading operations to improve performance.

21 Claims, 4 Drawing Sheets

METHOD AND APPARATUS FOR FACILITATING DEVICE HIBERNATION

RELATED APPLICATIONS

This application is a continuation application of, and hereby claims priority under 35 U.S.C. §120 to, pending U.S. patent application Ser. No. 12/581,029, titled "Method and Apparatus for Facilitating Device Hibernation," by inventors Dean Reece and Simon M. Douglas, filed 16 Oct. 2009. This application also claims priority under 35 U.S.C. §120 to application Ser. No. 11/411,363, titled "Method and Apparatus for Facilitating Device Hibernation," by inventors Dean Reece and Simon M. Douglas, filed 25 Apr. 2006, which issued as U.S. Pat. No. 7,640,440 on 29 Dec. 2009, and from which parent application Ser. No. 12/581,029 is a divisional application.

BACKGROUND

1. Field of the Invention

The present invention relates generally to techniques for saving power in computing devices. More specifically, the present invention relates to a method and an apparatus for facilitating device hibernation, wherein the active state of a computing device is preserved while power to the computing device is turned off.

2. Related Art

Power conservation is critically important for many types of computer systems. For example, portable computer systems need to conserve power in order to operate for long periods of time on battery power. Power conservation is also important for desktop computer systems in order to meet the strict power-usage requirements for ENERGY STAR qualification.

Many computer systems save power by entering a power-saving state known as "sleep mode," when they are not busy. During sleep mode, power is saved by placing much of the computer system in a low-power state, while power is maintained to volatile memory. Maintaining power to volatile memory preserves the active state of the computer system and thereby facilitates a nearly instant wake-up process, which provides an excellent user experience.

One drawback of existing sleep systems is that if power is lost during sleep mode, any unsaved work in volatile memory disappears. This loss of power can be easily triggered if a user is distracted for a few hours, or takes too long when performing a sleep-swap of the system battery. Unfortunately, as computer systems begin to incorporate larger amounts of random-access memory (RAM), correspondingly more power is required keep this RAM memory powered up during sleep mode. At the same time, as portable computer systems become progressively thinner and lighter, they contain correspondingly smaller batteries.

As a consequence of these trends, a few years ago, a laptop computer system could be expected to last multiple days in sleep mode, whereas at present, a new laptop computer system can rarely last more than a full day in sleep mode when it is configured with a maximum amount of RAM.

Hence, what is needed is a method and an apparatus that enables computer systems to save additional power beyond what can be saved by entering sleep mode.

SUMMARY

One embodiment of the present invention provides a system that enables a computing device to save additional power by entering a "hibernation mode," wherein the active state of the computing device is preserved in non-volatile storage while power to volatile storage is turned off. During operation, the system reanimates a computing device from a hibernation image by restoring reanimation code from the hibernation image and then executing the reanimation code. While executing this reanimation code, the system restores the rest of the hibernation image by, reading compressed data containing the rest of the hibernation image, and decompressing the compressed data using computational circuitry within the computing device. During this process, the decompression operations are overlapped with the reading operations to improve performance.

In a variation of this embodiment, restoring the rest of the hibernation image involves reading a decryption key from non-volatile random access memory, and using the decryption key to decrypt portions of the compressed data containing the rest of the hibernation image which were encrypted prior to storage in non-volatile memory.

In a variation on this embodiment, prior to restoring the reanimation code, the system compares a stored booter checksum, which was stored while generating the hibernation image, against a current booter checksum for a booter which is currently restoring the animation code. If the stored booter checksum does not match the current booter checksum, the system discontinues the reanimation process.

In a variation on this embodiment, prior to restoring the reanimation code, the system examines stored device configuration information, which was stored when the hibernation image was generated, to determine whether the configuration of the computing device has changed since the hibernation image was generated. If so, the system discontinues the reanimation process.

In a variation on this embodiment, after the hibernation image is decompressed, the system performs a wake-from-sleep operation to reanimate the computing device from the decompressed hibernation image.

In a variation on this embodiment, the system additionally sets a reanimation flag so that hibernation-aware drivers will know the wake-from-sleep operation is not a normal wake-from-sleep operation, but is instead part of a reanimation operation.

In a variation on this embodiment, prior to restoring the reanimation image, the system creates the hibernation image. This involves: (1) reserving space for the hibernation image in non-volatile storage; (2) forming the hibernation image by compressing portions of the active state of the computing device to form the compressed data and generating the reanimation code; and (3) storing the hibernation image in non-volatile storage.

In a further variation, creating the hibernation image additionally involves: (1) encrypting portions of the hibernation image, and storing a corresponding decryption key; (2) storing a booter checksum for a booter which will restore the hibernation image; (3) setting and storing a hibernation flag which indicates that a hibernation image has been stored; (4) storing a block number indicating where the hibernation image is stored; and (5) storing system configuration information for the computing device.

Another embodiment of the present invention provides a system that prepares a computing device to enter a hibernation mode while the computing device is entering a sleep mode. During operation, this system causes the computing device to enter the sleep mode, wherein power to the computing device is reduced, but power is maintained to volatile memory in the computing device. While computing device is entering sleep mode, the system creates a hibernation image for the device, and stores the hibernation image in non-volatile storage. At a later time, the system causes the device to enter the hibernation mode, wherein the active state of the computing device is preserved in non-volatile storage while power to volatile storage is turned off. By creating the hibernation image while the computing device is entering the sleep mode, the system can subsequently enter the hibernation mode from the sleep mode without having to generate the hibernation image.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs).

Computing Device

Figure 1:
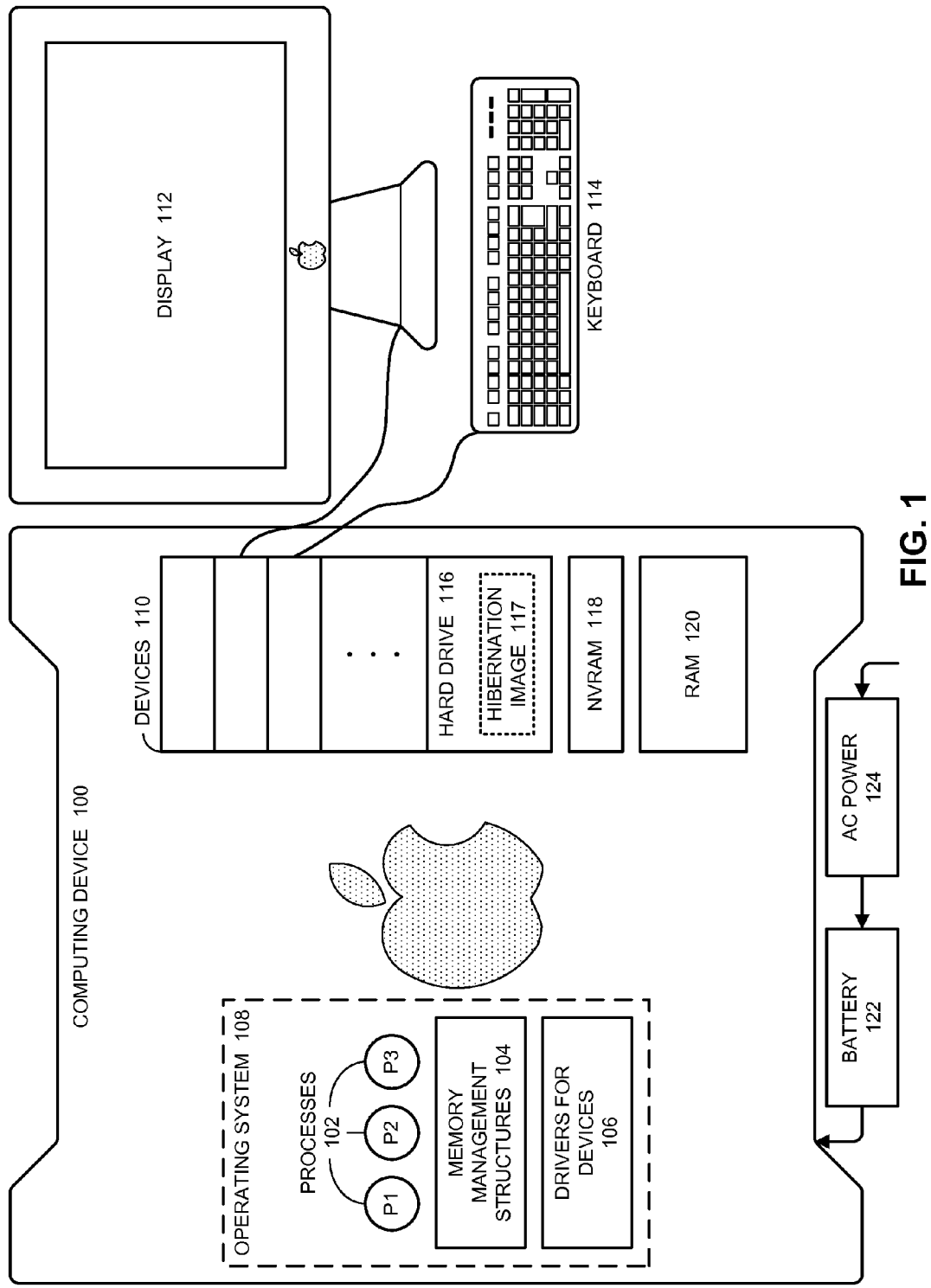
FIG. 1 illustrates a computing device in accordance with an embodiment of the present invention.

FIG. 1 illustrates a computing device 100 in accordance with an embodiment of the present invention. Computing device 100 can generally include any type of computing device or system, including, but not limited to, a computing device based on a microprocessor, a mainframe computer, a digital signal processor, a portable computing device, a personal organizer, a device controller, and a computational engine within an appliance.

Computing device 100 receives power from a battery 122, which can be coupled (through a transformer) to a source of alternating current (AC) power.

Computing device 100 includes a number of devices 110, such as a display 112 and a keyboard 114, as well as a hard drive 116. Note that a hibernation image 117 can be stored on hard drive 116 as is described in more detail below.

In additional to these devices 110, computing device 100 includes a random-access memory (RAM) 120, as well as a non-volatile random access memory (NVRAM) 118.

Computing device 100 also includes an operating system 108, which supports the execution of a number of processes 102. Operating system 108 also maintains memory management structures 104, such as page tables, and additionally provides drivers for devices 106.

Note that although the present invention is described in the context of the computing device 100 illustrated in FIG. 1, the present invention can generally operate on any type of computing device that can support a hibernation mode. Hence, the present invention is not limited to the specific computing device 100 illustrated in FIG. 1.

Items in NVRAM

Figure 2:
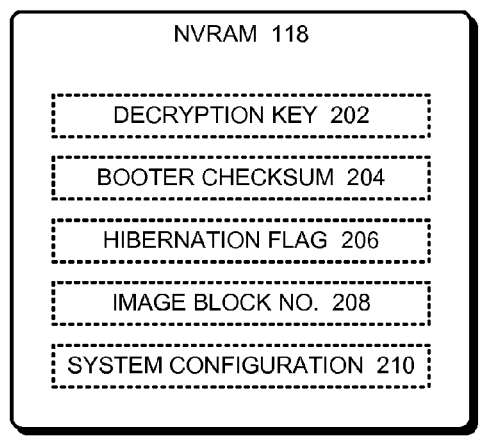
FIG. 2 illustrates items stored in non-volatile random-access memory (NVRAM) in accordance with an embodiment of the present invention.

FIG. 2 illustrates items stored in non-volatile random-access memory (NVRAM) 118 in accordance with an embodiment of the present invention. NVRAM 118 is ideally tamper-proof so that the contents of NVRAM 118 will disappear if NVRAM 118 is removed from computing device 110.

As is illustrated in FIG. 2, NVRAM 118 stores a number of items, including: decryption key 202, booter checksum 204, hibernation flag 206, image block number 208, and system configuration information 210. These items are used to support device hibernation as is described in more detail below with reference to FIGS. 4-5.

Hibernation Image

Figure 3:
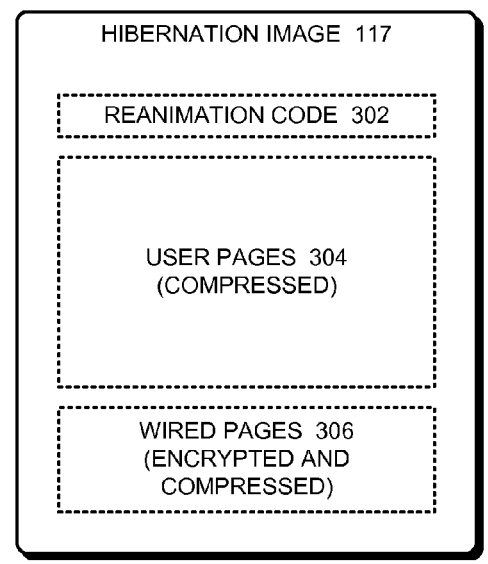
FIG. 3 illustrates the structure of a hibernation image in accordance with an embodiment of the present invention.

FIG. 3 illustrates the structure of hibernation image 117 (from FIG. 1) in accordance with an embodiment of the present invention. Hibernation image 117 includes reanimation code 302, which when executed by computing device 100 performs the operations required to complete the reanimation process. (Note that reanimation code can itself be compressed if the system booter supports decompression operations.)

Hibernation image 117 also contains "user pages" 304, which contain state information for the computing device and are compressed to save space.

Hibernation image 117 additionally contains "wired pages" which are both encrypted and compressed. These wired pages can contain sensitive information, such as passwords, which need to be protected by storing them in encrypted form in the hibernation image 117.

In one embodiment of the present invention, hibernation image 117 is referenced only by block number. To facilitate this block-based referencing, hibernation image 117 contains within itself a linked list of blocks in the image. This block-based referencing enables the booter to read the image from within a block device without having any knowledge of the file system format of the block device.

Process of Generating a Hibernation Image

Figure 4:
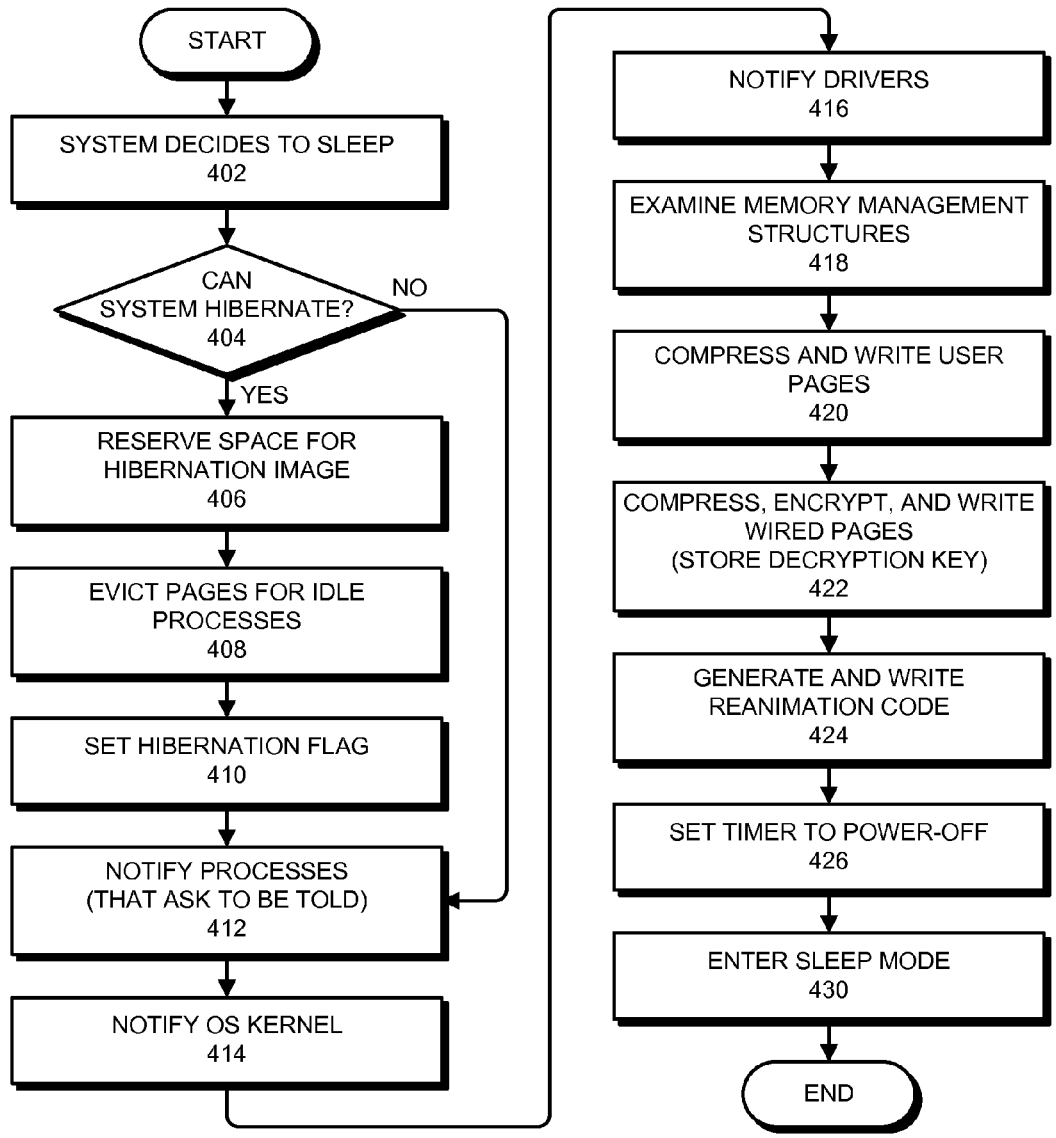
FIG. 4 presents a flow chart illustrating the process of generating a hibernation image while entering sleep mode in accordance with an embodiment of the present invention.

FIG. 4 presents a flow chart illustrating the process of generating a hibernation image while entering sleep mode in accordance with an embodiment of the present invention. The process starts when the system decides to sleep (step 402). This can occur automatically, for example if the system is in idle or is low on power. It can also be initiated by an explicit command from a user.

In order to enter sleep mode, the system first determines whether the system is capable of hibernating (step 404). This can involve looking at preset system configuration parameters. If the system is not capable of hibernating, the system defaults to the normal sleep path, which involves proceeding directly to step 412.

On the other hand, if the system is capable of hibernating, the system performs a number of operations in preparation for hibernation. In particular, the system reserves space on disk for the hibernation image (step 406). It can also evict pages for idle processes from memory (step 408). This reduces the number of pages that need to be stored in the hibernation image. The system also sets a hibernation flag (step 410). This hibernation flag indicates that a hibernation image has been created so that when the system subsequently boots up, the system will reanimate itself from the hibernation image, instead of performing a normal boot up operation.

The system next enters the normal sleep path to perform a number of operations. In particular, the system notifies processes that have asked to be informed that the system is entering a sleep mode (step 412). The system also notifies the operating system kernel that the system is entering sleep mode (step 414). The system can also notify various drivers that the system is entering sleep mode (step 416). Note that if the system is capable of hibernation, the disk driver does not spin the disk down, but instead keeps the disk spinning to prepare for a subsequent hibernation image write operation.

The system next enters a "hibernation-polled mode" in which the system prepares for hibernation. This involves examining memory management structures (step 418) and marking pages in memory as either having to be written to disk or not having to be written to disk. Note that pages that are already available on disk, such as pages containing application code or pages that can be reconstructed from other information on disk, are marked as not having to be written to disk. Whereas, other pages containing modified data are marked as having to be written to disk.

Next, the system compresses and writes user pages to disk (step 420). The system also encrypts and writes "wired pages" to disk (step 422). Recall that these wired pages may contain sensitive information, such as passwords, so it is desirable to encrypt them before they are stored on disk. The system also stores a corresponding decryption key, which can be used to decrypt to the encrypted pages, to NVRAM.

Finally, the system generates and writes reanimation code to disk (step 424). This reanimation code can be subsequently used to reanimate the hibernation image.

Next, the system can optionally set a timer which indicates the time when the system will subsequently enter hibernation mode (step 426). Finally, the system enters sleep mode (step 430), wherein power to the system is reduced, but power is maintained to volatile memory. If the system remains in sleep mode until the timer expires, the system will enter hibernation mode, wherein power to volatile storage is turned off. Note that by creating the hibernation image while the computing device is entering the sleep mode, the system can subsequently enter the hibernation mode from the sleep mode without having to generate the hibernation image. This is a significant advantage because when the system ultimately decides to hibernate there may be very little battery power left to generate a hibernation image. The hibernation operations also involve significant disk activity, which may be surprising to the user if this disk activity occurs at a later time. Furthermore, when waking up to create the hibernation image, the system is not guaranteed to be in a safe operating environment. It could be in the overhead bin on an airline flight, in the trunk of an automobile on a bumpy road, or could be subjected to even worse adverse conditions.

Process of Reanimating a Computing Device from a Hibernation Image

Figure 5:
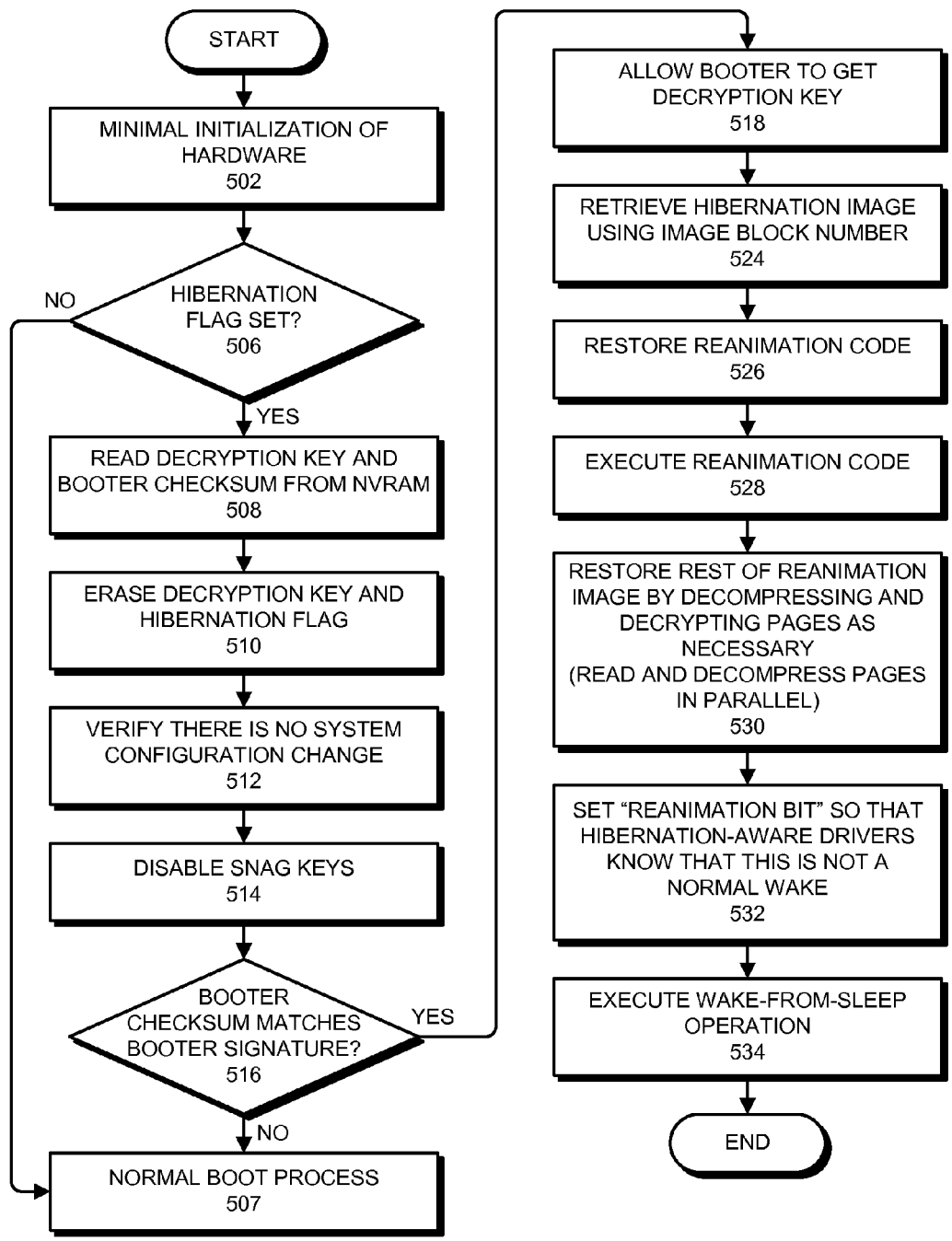
FIG. 5 presents a flow chart illustrating the process of reanimating a computing device from a hibernation image in accordance with an embodiment of the present invention.

FIG. 5 presents a flow chart illustrating the process of reanimating a computing device from a hibernation image in accordance with an embodiment of the present invention. This process starts during a normal boot up operation of computing device 100, which involves executing code from a system Boot Read-Only Memory (ROM) (not illustrated). First, the system performs a minimal initialization of the hardware (step 502). Next, the system checks if the hibernation flag 206 is set (step 506). If not, the system defaults to performing a normal boot operation (step 507).

On the other hand, if hibernation flag 106 is set, the system reads the previously stored decryption key 202 and booter checksum 204 from NVRAM 118 (step 508). The system then erases decryption key 202 and booter checksum 204 from NVRAM 118 (step 510). The system also compares the system configuration against the previously stored system configuration information 210 to verify that the system configuration has not changed since hibernation image 177 was created (step 512). If the configuration has changed, the system can perform a remedial action, such as defaulting to a normal boot operation. On the other hand, if the system configuration has not changed, the system disables "snag keys," which are used to select different boot modes (step 514).

The booter then commences executing a shortened boot path. During this shortened boot path, the system determines if the booter checksum 204 matches the booter checksum of the booter that is presently performing the boot up process (step 516). If not, the system defaults to the normal boot process (step 507). Otherwise, if booter checksum 204 matches the current booter's checksum, the system allows the booter to obtain the decryption key 202 (step 518).

Next, the system retrieves hibernation image 117 from the locations specified by the previously-stored image block number 208 (step 524). The system then restores the reanimation code 302 from hibernation image 117 (step 526), and begins executing reanimation code 302 (step 528).

Reanimation code 3027 effectively contains a "mini-kernel" which restores the rest of the state of computing device 100 from hibernation image 117 (step 530). More specifically, this involves reading and decompressing user pages 304 as well as reading, decompressing and decrypting wired pages 306. During this process, the reading operations can take place in parallel with the decompression operations to improve performance. This assumes that multiple buffers exist so that data can be read to a first buffer while data is being decompressed from a second buffer. The system also sets a reanimation flag so that hibernation-aware drivers can determine that this is not a normal wake operation (step 532).

Finally, after hibernation image 117 has been restored, the system performs a normal wake-from-sleep operation (step 534). During this process, the system can lazily evict clean pages that had valid data in them at image-creation time, but were not saved in order to reduce the image-writing time. Note that these clean pages are evicted only if power to memory was lost prior to the image-restoration process.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating a hibernation image before entering a sleep mode, comprising:
   in a computing device, performing operations for:
   determining that the sleep mode is to be entered;
   before entering the sleep mode, when the computing device is capable of entering a hibernation mode, performing operations in preparation for entering the hibernation mode, comprising:

evicting pages for idle processes from a memory in the computing device to reduce a number of pages to be written to the hibernation image on a disk in the computing device;

marking remaining pages in the memory as either to be written to disk or not to be written to disk, wherein pages that are already available on the disk or that can be reconstructed from other information on the disk are marked as not to be written to disk, and other pages are marked as to be written to the disk; and writing pages that are marked as to be written to the disk to the hibernation image on the disk; and entering the sleep mode.

2. The method of claim 1, wherein writing pages that are marked as to be written to the disk to the hibernation image on the disk comprises:

compressing and writing user pages to the hibernation image on the disk; and encrypting, compressing, and writing wired pages to the hibernation image on the disk, wherein wired pages comprise pages in the memory that may contain at least one of passwords or other sensitive information.

3. The method of claim 1, wherein performing operations in preparation for entering the hibernation mode further comprises:

generating and writing reanimation code to the hibernation image on the disk, wherein the reanimation code is used for restoring the computing device from the hibernation mode.

4. The method of claim 1, further comprising:

after entering the sleep mode, upon the occurrence of a predetermined event, entering the hibernation mode directly, wherein the hibernation image on the disk that was generated before entering sleep mode is used to subsequently reanimate the computing device.

5. The method of claim 1, further comprising:

setting a hibernation mode timer;

upon entering the sleep mode, starting the hibernation mode timer; and upon remaining in the sleep mode until the hibernation mode timer expires, entering the hibernation mode directly, wherein the hibernation image on the disk that was generated before entering sleep mode is used to subsequently reanimate the computing device.

6. The method of claim 1, wherein performing operations in preparation for entering the hibernation mode further comprises:

setting a hibernation flag to indicate that the hibernation image has been created so that, if the computing device subsequently boots up from the hibernation mode, the computing device reanimates itself from the hibernation image.

7. The method of claim 1, further comprising:

checking one or more configuration parameters and determining that the computing device is not capable of entering the hibernation mode; and based on the determination that the computing device is not capable of entering the hibernation mode, entering the sleep mode without performing operations in preparation for entering the hibernation mode.

8. An apparatus that generates a hibernation image before entering a sleep mode, comprising:

a processor;

a memory coupled to the processor; and a disk drive coupled to the processor and the memory;

wherein the processor is configured to:

determine that the sleep mode is to be entered;

before entering the sleep mode, when a hibernation mode can be entered, perform operations in preparation for entering the hibernation mode, comprising:

evicting pages for idle processes from the memory to reduce a number of pages to be written to the hibernation image on the disk drive;

marking remaining pages in the memory as either to be written to disk or not to be written to disk, wherein pages that are already available on the disk drive or that can be reconstructed from other information on the disk drive are marked as not to be written to disk, and other pages are marked as to be written to the disk; and writing pages that are marked as to be written to the disk to the hibernation image on the disk drive; and entering the sleep mode.

9. The apparatus of claim 8, wherein, when writing pages that are marked as to be written to the disk to the hibernation image on the disk drive, the processor is configured to:

compress and write user pages to the hibernation image on the disk drive; and encrypt, compress, and write wired pages to the hibernation image on the disk drive, wherein wired pages comprise pages in the memory that may contain at least one of passwords or other sensitive information.

10. The apparatus of claim 8, wherein, when performing operations in preparation for entering the hibernation mode, the processor is configured to:

generate and write reanimation code to the hibernation image on the disk drive.

11. The apparatus of claim 8, wherein the processor is configured to:

after entering the sleep mode, upon the occurrence of a predetermined event, entering the hibernation mode directly, wherein the hibernation image on the disk drive that was generated before entering the sleep mode is used to subsequently recover from the hibernation mode.

12. The apparatus of claim 8, wherein the processor is further configured to:

set a hibernation mode timer;

upon entering the sleep mode, start the hibernation mode timer; and upon remaining in the sleep mode until the hibernation mode timer expires, enter the hibernation mode directly, wherein the hibernation image on the disk drive that was generated before entering the sleep mode is used to subsequently recover from the hibernation mode.

13. The apparatus of claim 8, wherein, when performing operations in preparation for entering the hibernation mode, the processor is configured to:

set a hibernation flag to indicate that the hibernation image has been created so that, if subsequently recovering from the hibernation mode, the hibernation image on the disk drive that was generated before entering the sleep mode is used to recover from the hibernation mode.

14. The apparatus of claim 8, wherein the processor is configured to:

check one or more configuration parameters and determine that the hibernation mode cannot be entered; and based on the determination that that the hibernation mode cannot be entered, entering the sleep mode without performing operations in preparation for entering the hibernation mode.

15. A computer system that generates a hibernation image before entering a sleep mode, comprising:

a processor;
a memory coupled to the processor;
a disk drive coupled to the processor and the memory; and
a display coupled to the processor;
wherein the processor is configured to:
- determine that the sleep mode is to be entered;
- before entering the sleep mode, when a hibernation mode can be entered, perform operations in preparation for entering the hibernation mode, comprising:
  - evicting pages for idle processes from the memory to reduce a number of pages to be written to the hibernation image on the disk drive;
  - marking remaining pages in the memory as either to be written to disk or not to be written to disk, wherein pages that are already available on the disk drive or that can be reconstructed from other information on the disk drive are marked as not to be written to disk, and other pages are marked as to be written to the disk; and
  - writing pages that are marked as to be written to the disk to the hibernation image on the disk drive; and
- entering the sleep mode.

16. The computer system of claim 15, wherein, when writing pages that are marked as to be written to the disk to the hibernation image on the disk drive, the processor is configured to:
- compress and write user pages to the hibernation image on the disk drive; and
- encrypt, compress, and write wired pages to the hibernation image on the disk drive, wherein wired pages comprise pages in the memory that may contain at least one of passwords or other sensitive information.

17. The computer system of claim 15, wherein, when performing operations in preparation for entering the hibernation mode, the processor is configured to:
- generate and write reanimation code to the hibernation image on the disk drive.

18. The computer system of claim 15, wherein the processor is configured to:
- after entering the sleep mode, upon the occurrence of a predetermined event, entering the hibernation mode directly, wherein the hibernation image on the disk drive that was generated before entering the sleep mode is used to subsequently recover from the hibernation mode.

19. The computer system of claim 15, wherein the processor is further configured to:
- set a hibernation mode timer;
- upon entering the sleep mode, start the hibernation mode timer; and
- upon remaining in the sleep mode until the hibernation mode timer expires, enter the hibernation mode directly, wherein the hibernation image on the disk drive that was generated before entering the sleep mode is used to subsequently recover from the hibernation mode.

20. The computer system of claim 15, wherein, when performing operations in preparation for entering the hibernation mode, the processor is configured to:
- set a hibernation flag to indicate that the hibernation image has been created so that, if subsequently recovering from the hibernation mode, the hibernation image on the disk drive that was generated before entering the sleep mode is used to recover from the hibernation mode.

21. The computer system of claim 15, wherein the processor is configured to:
- check one or more configuration parameters and determine that the hibernation mode cannot be entered; and
- based on the determination that that the hibernation mode cannot be entered, entering the sleep mode without performing operations in preparation for entering the hibernation mode.

* * * * *